United States Patent
Park et al.

(10) Patent No.: US 7,457,288 B2
(45) Date of Patent: Nov. 25, 2008

(54) RELAY MULTICAST SYSTEM AND METHOD FOR PROVIDING EFFICIENT GROUP COMMUNICATION SERVICE

(75) Inventors: Juyoung Park, Daejeon (KR); Shin Gak Kang, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 496 days.

(21) Appl. No.: 10/933,656

(22) Filed: Sep. 2, 2004

(65) Prior Publication Data

US 2005/0152367 A1 Jul. 14, 2005

(30) Foreign Application Priority Data

Dec. 26, 2003 (KR) .................. 10-2003-0097176
Apr. 19, 2004 (KR) .................. 10-2004-0026641

(51) Int. Cl.
*H04L 12/56* (2006.01)
*H04L 12/28* (2006.01)

(52) U.S. Cl. ............... 370/390; 370/254; 370/406; 370/252; 709/232; 709/223; 709/204

(58) Field of Classification Search ........... 370/390, 370/254, 406, 252, 432, 401, 389, 312; 709/232, 709/223, 204

See application file for complete search history.

(56) References Cited

U.S. PATENT DOCUMENTS

2002/0196802 A1* 12/2002 Sakov et al. ............ 370/432
2003/0009576 A1* 1/2003 Apostolopoulos et al. ... 709/231
2003/0048750 A1* 3/2003 Kobayashi ................. 370/229
2004/0137885 A1* 7/2004 Sarkkinen et al. ........ 455/414.1
2004/0148421 A1* 7/2004 Achtermann et al. ....... 709/232
2004/0172559 A1* 9/2004 Luo et al. .................. 713/201
2005/0021617 A1* 1/2005 Rusitschka ................. 709/204

FOREIGN PATENT DOCUMENTS

| KR | 010073814 A | 8/2001 |
| KR | 010083840 A | 9/2001 |
| KR | 20010105387 A | 11/2001 |
| KR | 1020020023100 A | 3/2002 |
| KR | 1020020045695 A | 6/2002 |

* cited by examiner

*Primary Examiner*—Duc Nguyen
*Assistant Examiner*—Julio R Perez
(74) *Attorney, Agent, or Firm*—Blakely, Sokoloff, Taylor & Zafman

(57) ABSTRACT

Provided are a relay multicast system and method for providing efficient group communication services. In the relay multicast system, each multicast feeder can make a peer to open connection with multicast feeders in other classes by selecting an optimal multicast feeder based on available resources of each relay multicast feeder in order to efficiently form a data forwarding route of a relay group. Also, in order to form a relay channel, the relay multicast system negotiates and uses a most appropriate channel between hops, not a data forwarding channel unified in a session or group. Also, in order to forward data to a specific group, the relay multicast system connects local multicast domains, in which it is possible to multicast or broadcast on a small scale as in a local area network (LAN) or a company network in which multicast members of the group are included, without changing an existing 1:1 unicast based Internet infrastructure.

22 Claims, 14 Drawing Sheets

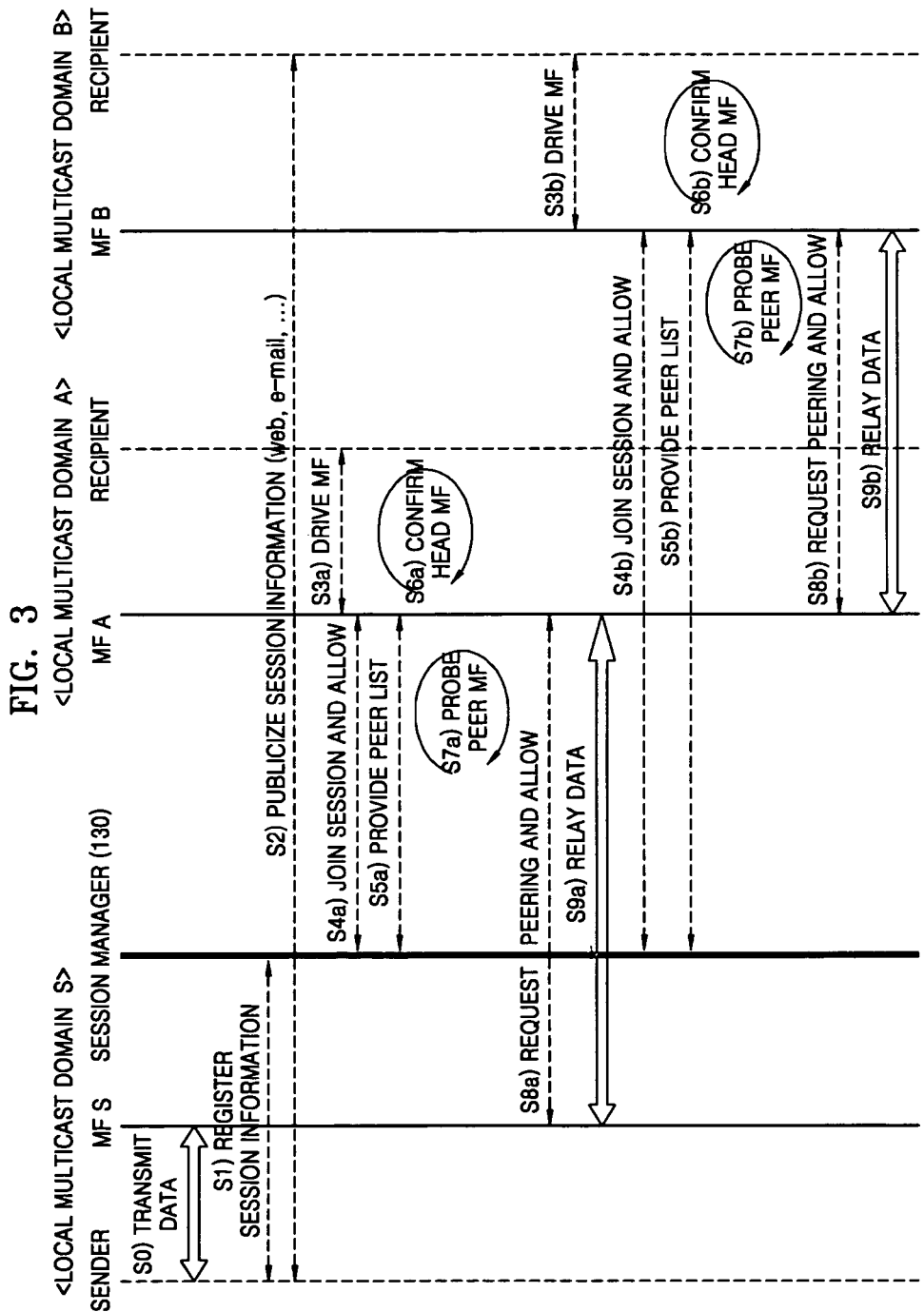

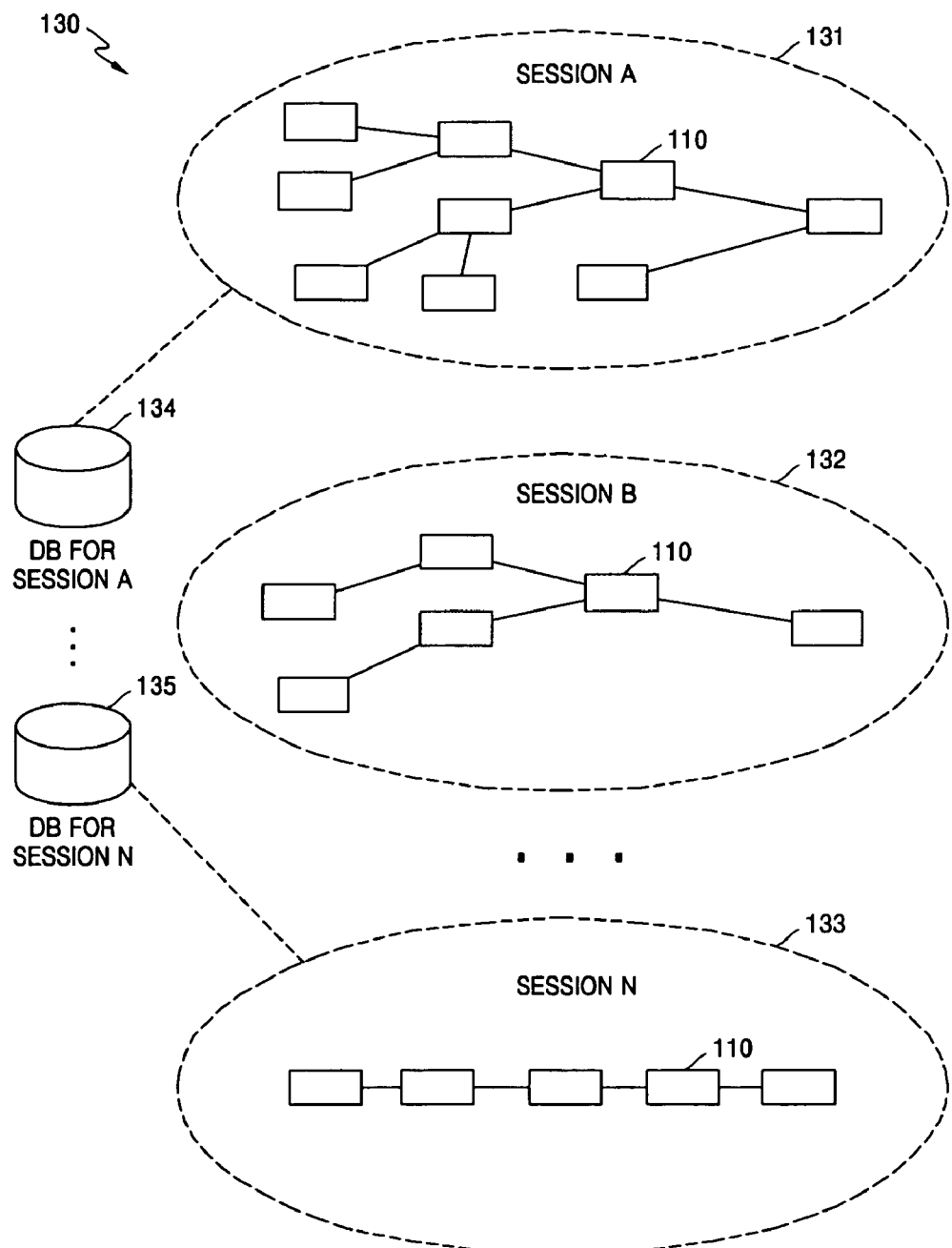

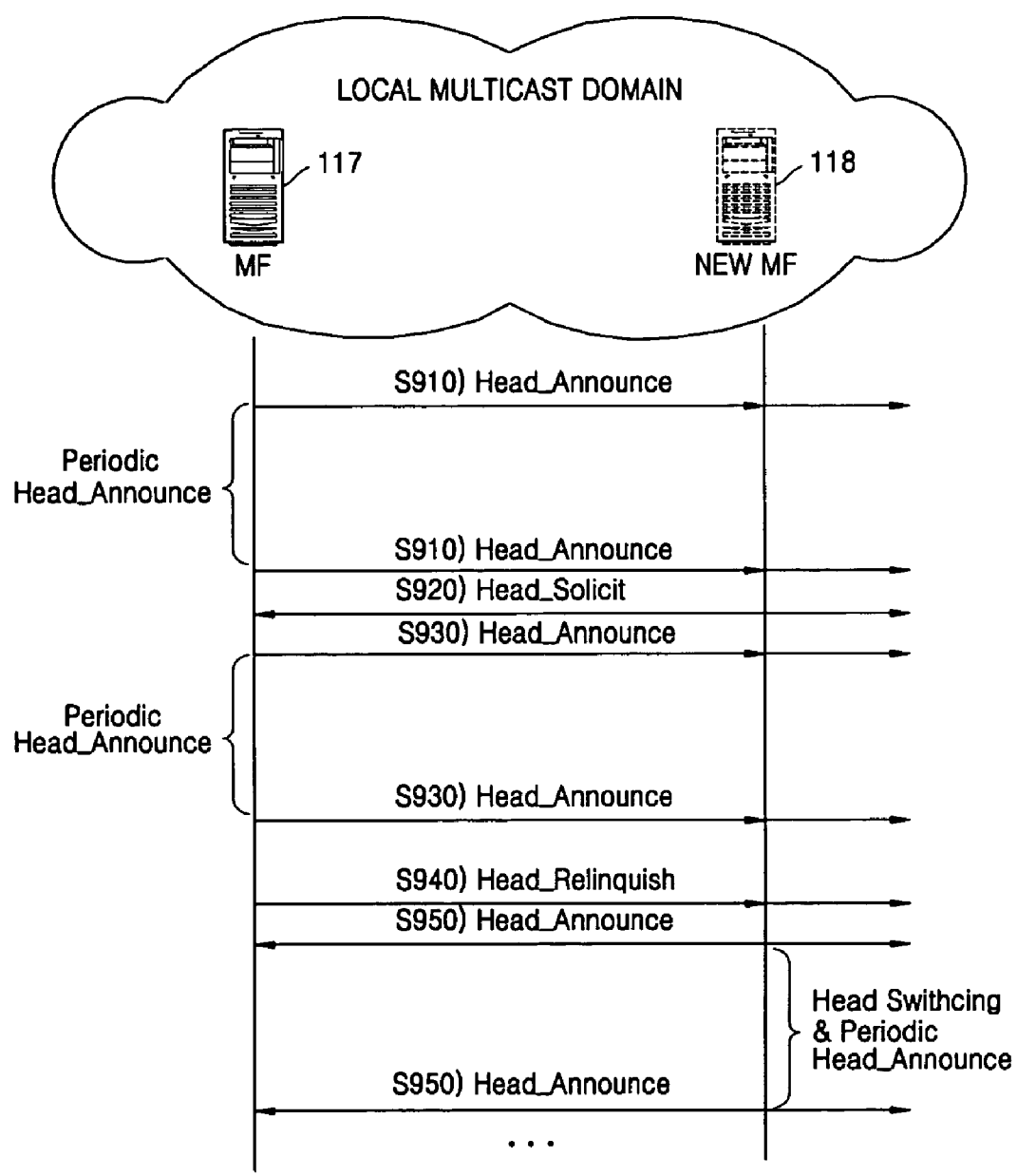

RELAY MULTICAST SYSTEM AND METHOD FOR PROVIDING EFFICIENT GROUP COMMUNICATION SERVICE

BACKGROUND OF THE INVENTION

This application claims the priority of Korean Patent Application Nos. 2003-97176, filed on Dec. 26, 2003 and 2004-26641, filed on Apr. 19, 2004 in the Korean Intellectual Property Office, the disclosures of which are incorporated herein in their entirety by reference.

1. Field of the Invention

The present invention relates to a group communication system, and more particularly, to a relay multicast system and a method thereof.

2. Description of the Related Art

Recently, group communication applications such as live broadcasts and network games have been developed. To provide group communication over the Internet, since one sender must repeatedly transmit the same data to a plurality of recipients, network resources are wasted and the load of a transmission server increases.

To solve this problem, Internet protocol (IP) multicast technology had been suggested. However, because of problems such as having to change all routers to multicast routers, the multicast technology has not become popular yet, and only partial infrastructures, such as campus networks, company networks, or experimental networks, have adopted the multicast technology. Since the costs for changing all existing routers to multicast routers are high, IP multicast addresses must be allocated, and technical problems related to multicast routing protocols and hardware management mechanisms exist, the multicast technology cannot perfectly support network communication. One of the technical problems preventing use of the multicast technology is related to the load of a router. A conventional multicast backbone router wastes too many resources to manage frequent routing table change caused by members who occasionally join/leave a group. A main cause of the large load is not using an IP unicast mechanism as an addressing system. In an IP unicast environment, a hierarchical addressing system can be built by using static addresses included in an address (network address) block of a network to which every network interface card (NIC) of a system belongs. However, in an IP multicast environment, even though a system has one NIC, the system uses a dynamic, non-hierarchical IP addressing system which allows the system to have or change one or more addresses at any time when opening and terminating applications. Therefore, In the IP unicast environment, a data route between routers can be set regardless of whether an application program is started. To route data in the IP multicast environment, an application program joins a communication group, the data route is set between IP multicast routers, and a communication route of the data is generated.

Recently, technology allowing multicasting to be performed using a program in an application layer without changing connection equipment has been developed. A multicast method used by the technology allows IP multicasting between a sender and recipients to be performed by connecting a non-multicast area, in which a multicast router is not directly connected to a multicast backbone, to the multicast backbone via a virtual multicast router using tunneling technology. Even though general-use personal computer (PC) users can use IP multicasting by accessing a virtual multicast router using the multicast method, IP multicast address collision and an increased load for managing multicast routing status information in each multicast device cannot be completely prevented. Also, since the tunneling technology used to connect a non-multicast area to a multicast backbone uses only tunneling between the non-multicast area and a local area hop, a bottleneck can occur at intermediate nodes for tunneling. As described above, in an overlay or application layer multicast mechanism allowing a terminal host joining relevant communication to control data transfer from a sender to recipients without an IP multicast router, since the terminal host, such as a general-use PC or a workstation, not network equipment such as a router, is used as an intermediate node for data transfer, a mechanism that can efficiently set a data transfer route and handle various errors such as node termination is required.

SUMMARY OF THE INVENTION

The present invention provides a relay multicast system and method allowing overlay multicast communication to be performed without changing a conventional Internet infrastructure with a 1:1 unicast method in a multicast network in which all resources and bands of a sending node can be efficiently used when a sender simultaneously transmits the same data to a plurality of recipients, and allowing a relatively fast, error-resistant, and efficient multicast tree to be formed when group data routing is performed in a lower layer than a network layer.

According to an aspect of the present invention, there is provided a relay multicast system comprising multicast feeders, local subnets, and a session manager. Each of the multicast feeders generates a session join request signal, receives same class peer list information, and relays multicast data transmission/reception. Each of the local subnets communicates with a relevant multicast feeder in its own local multicast domain. The session manager manages session information of the multicast feeders and generates the same class peer list information in response to the session join request signals.

The session manager can determine whether session joining of the multicast feeders is allowed using the session information, and each of the multicast feeders sets a relay route using the same class peer list information. The session manager can allow multicast feeders authenticated by an authentication policy included in the session information to join the session, or the session manager can allow all multicast feeders requesting to join the session without authentication.

When each of the multicast feeders joins a session, if the multicast feeder receives the same class peer list information, the multicast feeder can determine whether the multicast feeder is a unique feeder in a local multicast domain. If the multicast feeder is the unique feeder in the local multicast domain, the multicast feeder can select an optimal peer multicast feeder from the same class peer list information and communicates with the selected peer multicast feeder by negotiating a hop-by-hop channel. After each of the multicast feeders joins the session, if resources of the selected optimal peer multicast feeder are exhausted, the multicast feeder can reselect an optimal peer multicast feeder from the other multicast feeders and communicates with the reselected peer multicast feeder by negotiating a hop-by-hop channel. If each of the multicast feeders has available resources, when the multicast feeders receive peering requests from the other multicast feeders, each of the multicast feeders can allow the peering request and communicate with the other multicast feeder which has transmitted the peering request by negotiating a hop-by-hop channel. Each of the multicast feeders can receive a peer multicast feeder change request from a user via a multicast feeder joined in a session, reselect an optimal peer multicast feeder to communicate with from the other multicast feeders, and communicate with the reselected peer multicast feeder by negotiating a hop-by-hop channel. Each of the multicast feeders can relay multicast data transmission/reception by changing the received relay data to data corresponding to a communication protocol of another multicast feeder to which the relay data is to be transmitted according to channel negotiation with the other multicast feeder to which received relay data is transmitted.

The session information can comprise session definition, session joining conditions, a list of relayable multicast feeders, status information of the multicast feeders and the session, and user definition information. The same class peer list information can be related to multicast feeders having the same class performance as a multicast feeder, which intends to join in the session.

According to another aspect of the present invention, there is provided a relay multicast communication method comprising: generating session join request signals in multicast feeders; generating same class peer list information in response to the session join request signals in a session manager; receiving the same class peer list information and relaying multicast data transmission/reception in the multicast feeders. The session manger manages session information to be used to determine whether session joining of the multicast feeders is allowed, and the multicast feeders can set a relay route using the same class peer list information. Multicast feeders authenticated by an authentication policy included in the session information can be allowed to join the session, or all multicast feeders desiring to join the session can be allowed to join the session without authentication.

When each of the multicast feeders joins a session, if a multicast feeder receives the same class peer list information, the multicast feeder can determine whether the multicast feeder is a unique feeder in a local multicast domain, select an optimal peer multicast feeder from the same class peer list information, and communicate with the selected peer multicast feeder by negotiating a hop-by-hop channel. After each of the multicast feeders joins the session, if resources of the selected optimal peer multicast feeder are exhausted, the multicast feeder can reselect an optimal peer multicast feeder from the other multicast feeders and communicate with the reselected peer multicast feeder by negotiating a hop-by-hop channel. If each of the multicast feeders has available resources, when the multicast feeders receive peering requests from the other multicast feeders, each of the multicast feeders can allow the peering request and communicate with the other multicast feeder which has transmitted the peering request by negotiating a hop-by-hop channel. Each of the multicast feeders can receive a peer multicast feeder change request from a user via a multicast feeder joined in a session, reselect an optimal peer multicast feeder to communicate with from the other multicast feeders, and communicate with the reselected peer multicast feeder by negotiating a hop-by-hop channel.

BRIEF DESCRIPTION OF THE DRAWINGS

The above and other features and advantages of the present invention will become more apparent by describing in detail exemplary embodiments thereof with reference to the attached drawings in which:

FIG. 3 is a diagram illustrating an operation of the relay multicast system of FIG. 1;

FIG. 4 is a block diagram of a session manager of FIG. 1;

FIG. 9 illustrates a mechanism for guaranteeing a unique multicast feeder in a local multicast domain;

DETAILED DESCRIPTION OF THE INVENTION

Hereinafter, the present invention will now be described more fully with reference to the accompanying drawings, in which embodiments of the invention are shown. Like reference numbers are used to refer to like elements through at the drawings.

Figure 1:
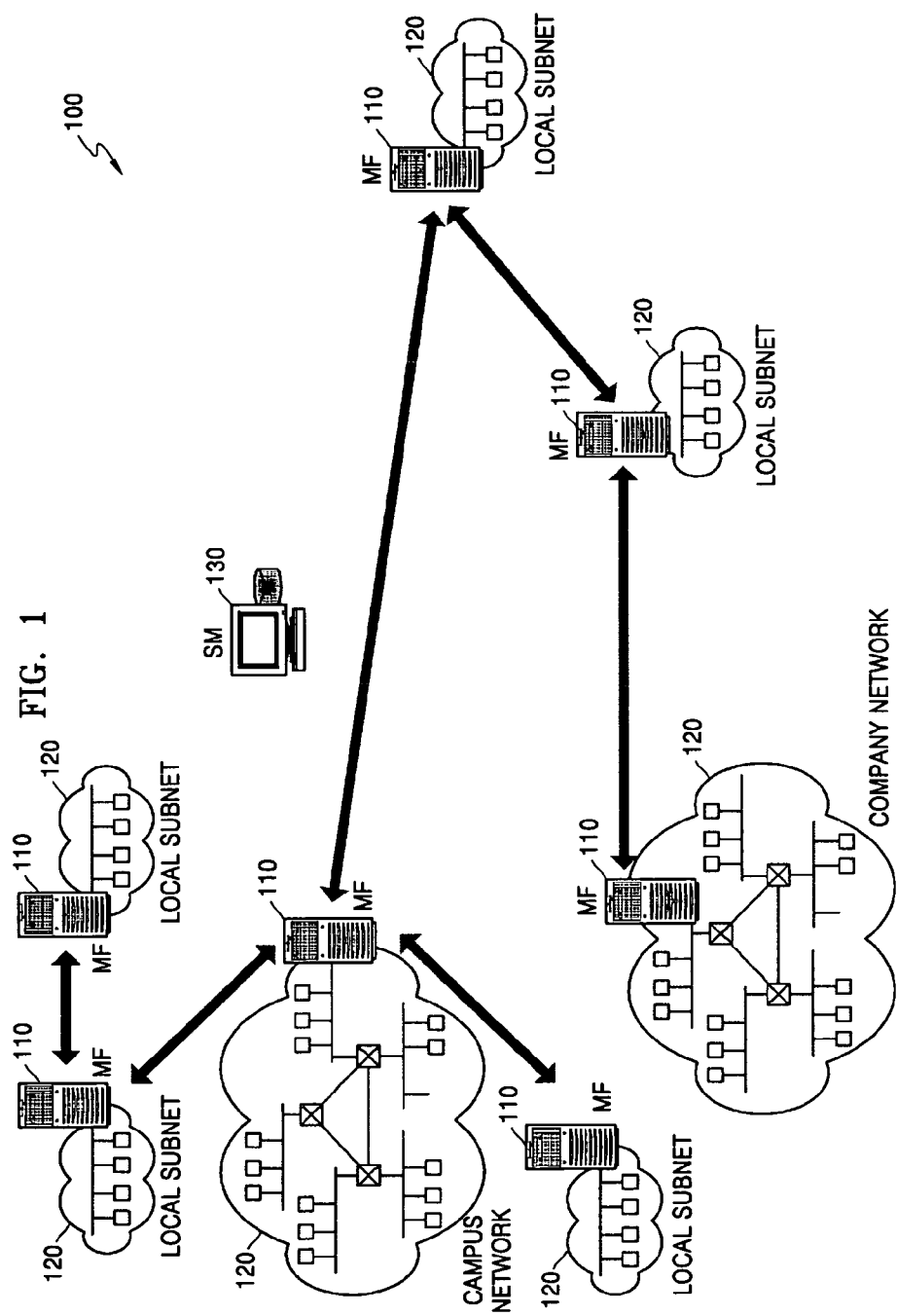
FIG. 1 is a block diagram of a relay multicast system according to an embodiment of the present invention.

FIG. 1 is a block diagram of a relay multicast system (RMS) 100 according to an embodiment of the present invention. Referring to FIG. 1, the RMS 100 includes multicast feeders 110, local subnets 120, and a session manager 130.

In the RMS 100 according to an embodiment of the present invention, multicast data relay services are efficiently provided in all network communication environments without changing infrastructure based on a current communication network (for example, Internet) by simply installing function blocks in users' personal multicast feeders 110 (for example, PCs) using software or modified hardware.

The multicast feeders 110 may be desktop PCs, servers, or other computing devices existing in local multicast domains to which users desiring to receive specific group data belong. Each of the local subnets 120 communicates with a multicast feeder 110 in a multicast domain to which each local subnet 120 belongs. The multicast feeders 110 relay group data transmitted from a multicast feeder 110 on a sending side to another multicast feeder 110 on a receiving side. The session manager 130 manages statuses of the multicast feeders 110 and provides information to set a relay route between the multicast feeders 110. In a conventional multicast mechanism, since a sender can transmit to any recipients having a certain group address, an IP multicast address collision can occur. To solve this problem, the RMS 100 defines conversation between users belonging to a specific group or applications, i.e., the multicast feeders 110, as a session, and a unique session ID can be identified over the entire network such as the Internet.

Figure 2A:
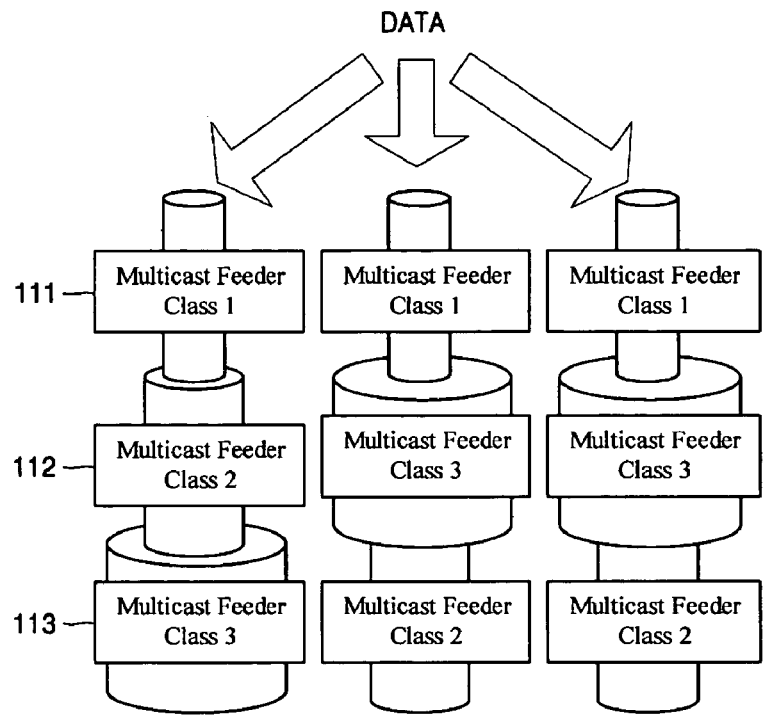
FIGS. 2A and 2B illustrate data route setting methods considered by the relay multicast system of FIG. 1.
Figure 2B:
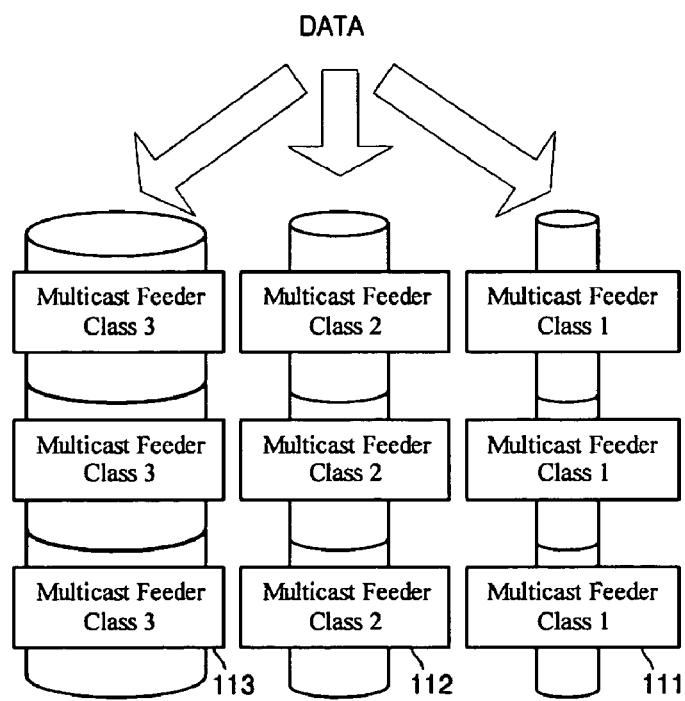

FIGS. 2A and 2B illustrate data route setting methods that can be performed by the RMS 100 of FIG. 1. In the RMS 100, an optimal route composed of intermediate multicast feeders 110 is formed so that group data sent by a sending multicast feeder 110 can be forwarded to receiving multicast feeders 110 at terminals via a unicast network. A route through which data is forwarded between multicast the feeders 110 included in the route is a channel composed of hop-by-hop units. Therefore, when the route through which the data is forwarded between a sender and recipients is set, the data is transmitted via a hop-by-hop channel between multicast feeders 110. On the other hand, conventionally, to set a transmission route, selection of node pairs composing a channel is simply based on a minimal distance. However, as shown in FIG. 2A, applying the conventional transmission method to a conventional system may cause a bottleneck depending on system resources or transmission performance. Therefore, unlike the conventional transmission method, in an embodiment of the present invention, in order to prevent a bottleneck, a transmission route is formed by classifying multicast feeders 111, 112, and 113 into classes as shown in FIG. 2B. This method will now be described in detail.

FIG. 3 is a diagram illustrating an operation of the RMS 100 of FIG. 1. Referring to FIG. 3, a sender or a session starter transmits data by installing a multicast feeder (MF S) in a system for a multicast application, i.e., a local multicast domain S, and registers session information related to a group in a session manager 130 in operations S0 and S1. The session information is publicized to all receiving multicast feeders (MF A and MF B) by web, e-mail, or a session notice program specifically designed for the RMS 100 in operation S2. A recipient intending to join the publicized group communication generates a session join request signal by driving a multicast feeder (MF A), which is installed in the recipient's PC, or communicates with local subnets 120 in a local multicast domain A, in operation S3a. The receiving multicast feeder (MF A) receives an acknowledgement in response to the session join request signal from the session manager 130 in operation S4a and receives from the session manager 130 peer list information of peer multicast feeders to which the receiving multicast feeder (MF A) can connect with a peer-to-peer method after receiving the session join allowance, in operation S5a. The multicast feeder (MF A) confirms that it is a unique multicast feeder (Head MF) in the local multicast domain A in operation S6a and probes for an optimal peer multicast feeder in operation S7a. When the multicast feeder (MF A) selects the optimal peer multicast feeder, the multicast feeder (MF A) requests peering with the optimal peer multicast feeder in operation S8a and starts data relay with the optimal peer multicast feeder in operation S9a. Another multicast feeder (MF B) also performs data relay with a selected peer multicast feeder by performing operations S3b through S9b, which are equivalent to operations S3a through S9a.

FIG. 4 is a block diagram of the session manager 130 of FIG. 1. Referring to FIG. 4, the session manager 130 can manage one or more sessions 131 through 133. As described above, a session refers to a conversation between users belonging to a specific group or applications, i.e., multicast feeders 110. The session manager 130 manages session information of each group communication in databases 134 and 135 and provides peer list information so that multicast feeders 110 can set a data transmission route. The session information includes a session definition such as a session protocol, session joining conditions, a list of relayable multicast feeders 110, status information of multicast feeders 110 and session, and user defined information. In particular, when multicast feeders 110 generate session join request signals for setting data relay routes, the session manager 130 provides same class peer list information to the multicast feeders 110 when join is allowed. The same class peer list information is list information regarding multicast feeders 110 having the same class performance as a multicast feeder 110 intending to join a session.

Figure 5:
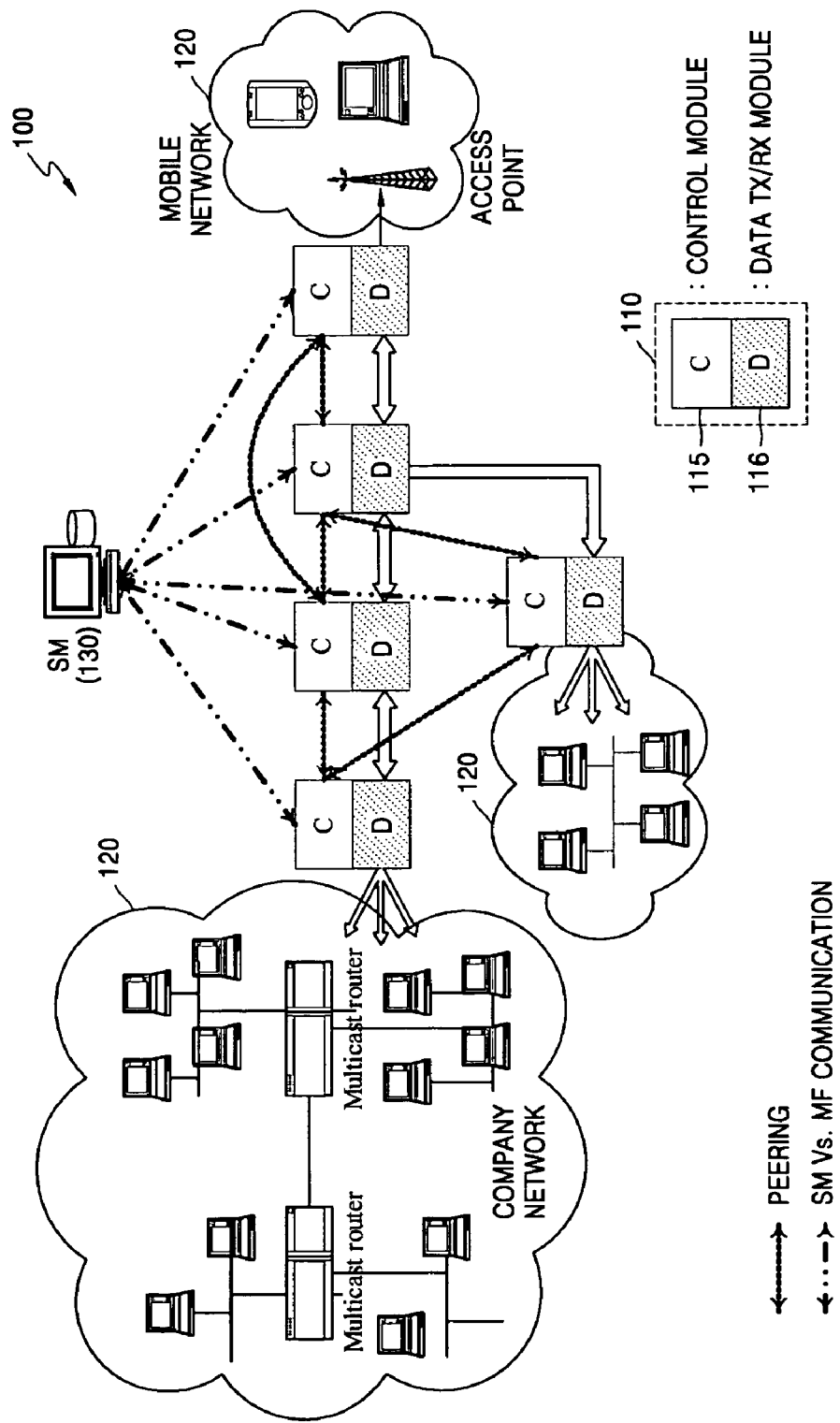
FIG. 5 is a detailed block diagram of the relay multicast system of FIG. 1.

FIG. 5 is a detailed block diagram of the RMS 100 of FIG. 1. Referring to FIG. 5, each multicast feeder 110 includes a control module 115 and a data transmitting/receiving module 116. The data transmitting/receiving module 116 performs data relay with another multicast feeder 110 in response to multicast control for group communication received from the control module 115. In group communication between multicast feeders 110, a unique multicast feeder (Head MF) in a local multicast domain can communicate with predetermined terminals (for example, PCs) connected to a local subnet 120 such as a company network via a predetermined router. Also, each multicast feeder 110 can communicate with other predetermined terminals (for example, mobile terminals) connected to a wireless local subnet 120 such as a wireless communication network via a predetermined access point, i.e., a local station.

That is, each of the multicast feeders 110 can be realized as a PC or another computing device. Also, each of the multicast feeders 110 can be realized in the same systems or in a different system than an application program. The multicast feeders 110 relay group data from a sender to terminal recipients by setting each one in a session of an RMS 100 as "Head MF" in their respective local multicast domains. Since each of the multicast feeders 110 receives data directly from a sender and relays the received data to terminals in a local multicast domain by peer-to-peer connecting to predetermined terminals connected to a local subset 120, the load of a network does not increase due to the addition of multicast feeders 110. Each of the multicast feeders 110 relays received data to neighboring peer multicast feeders 110 or transmits the data to receiving terminals in a local multicast domain to which the multicast feeder 100 belongs. To prevent duplicated data from being generated in a local multicast domain and set an efficient data forwarding route, one of the multicast feeders 110 in each of the local multicast domains is set as a unique multicast feeder (Head MF), and only the unique multicast feeder (Head MF) communicates with the other unique multicast feeders 110 in the other local multicast domains. That is, terminals connected via a local subnet 120 in a local multicast domain communicate with a unique multicast feeder (Head MF) in the local multicast domain with a peer-to-peer relationship. Also, each of the multicast feeders 110 receives information related to available multicast feeders 110 (same class peer list information) from a session manager 130 and the other multicast feeders 110, selects an optimal peer multicast feeder 110, and communicates with the selected peer multicast feeder 110 by negotiating a hop-by-hop channel.

Meanwhile, as described above, the session manager 130 manages a list of the multicast feeders 110 operating in an RMS session and allows session joining requests from the multicast feeders 110 or sets a data forwarding route between the multicast feeders 110. The session manager 130 can be realized as software and manage one or more RMS sessions according to system performance. However, the session manager 130 is not directly used for a data forwarding process or a data transmission route forming process. The operation of the session manager 130 will now be described.

Figure 6:
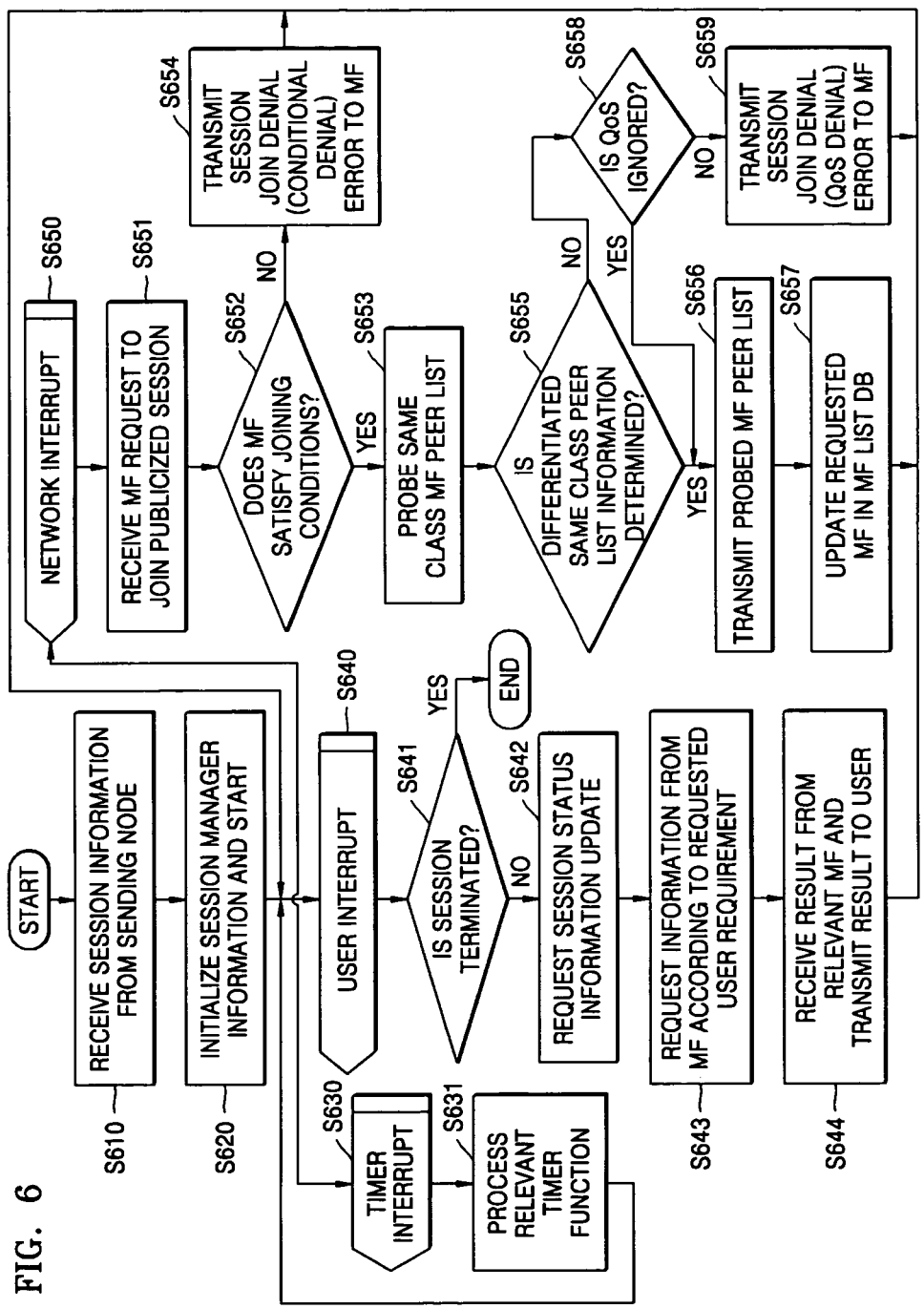
FIG. 6 is a flowchart illustrating the operation of a session manager.

FIG. 6 is a flowchart illustrating the operation of the session manager 130. Referring to FIG. 6, the session manager 130 registers session information related to group communication received from a sender or a session starter by adding a multicast feeder 110 to a local multicast domain in operation S610. The session manager 130 can simultaneously manage a plurality of sessions as described above, and the session manager 130 initializes a session in response to the session information received from the session starter in operation S620. After the session starts once, the session manager 130 mainly operates in response to three kinds of events.

First, when a timer interrupt is generated in operation S630, the session manager 130 operates according to a function defined by a predetermined timer included in the session manager 130 and checks for other interrupts periodically or non-periodically in operation S631.

Second, when a user interrupt is generated in operation S640, the session manager 130 operates as follows. The user mainly requests whether the session is finished and to collect the RMS session information in operations S641 through S644. When the user requests from the session manager 130 statuses (various kinds of parameters required by the user, such as a data transmission rate and an error rate) of a specific multicast feeder 110 or all the multicast feeders 110 in the RMS session, or when the user requests to the session manager 130 a list of entire multicast feeders 110 currently joining the RMS session or a list of recipients, the session manager 130 collects the relevant information and transmits the received information to the user in operations S642 through S644.

Third, when a network interrupt is generated in operation S650, an RMS session join request is received from a multicast feeder 110 in operation S651. In this process, the RMS session can be divided into an open-type session in which all can join and a closed-type session in which only authorized specific members can join.

Therefore, if the session manager 130 receives a session join request signal from a multicast feeder 110 in operation S651, the session manager 130 determines whether the multicast feeder 110 satisfies joining conditions in operation S652. If the multicast feeder 110 satisfies the joining conditions in operation S652, the session manager 130 generates the same class peer list information in response to the session join request signal in operations S652 and S653. If the multicast feeder 110 does not satisfy the joining conditions in operation S652, the session manager 130 transmits a join denial error to the multicast feeder 110 in operation S654. When the session manager 130 determines whether the multicast feeder 110 satisfies the joining conditions, if the RMS session is the open-type session, the session manager 130 allows every session join request from every multicast feeder 110 in operation S652. However, if the RMS session is the closed-type session, the session manager 130 determines whether the joining of the multicast feeder 110 is allowed in operation S652 according to a login included in the session information, an authentication key granted by an authenticating method, or various kinds of policies granted when the session is generated (for example, whether the multicast feeder 110 intending to join provides a relay function, a hardware condition of the multicast feeder 110, etc.).

If the joining of the multicast feeder 110 is allowed, the session manager 130 transmits information (same class peer list information) to the multicast feeder 110 so that the multicast feeder 110 can set a data forwarding route to other multicast feeders 110. However, since the session manager 130 does not directly participate in the data forwarding route and does not know the configuration of the network, the session manager 130 cannot provide information indicating an optimal route between multicast feeders 110. Therefore, the multicast feeder 110 must find out the optimal data forwarding route by itself. To do this, the session manager 130 provides the same class peer list information differentiated according to characteristics to the multicast feeder 110 in operations S653 and S655. The differentiated peer list information of the multicast feeders 110 of the same class is not valid if quality of service (QoS) is considered in the RMS session in operation S658. That is, when the session manager 130 cannot determine the differentiated same class peer list information and the QoS is considered, the session manager 130 transmits a join denial error to the multicast feeder 110 in operation S659. When the session manager 130 determines the differentiated same class peer list information, or when the QoS is not considered, the session manager 130 provides the same class peer list information to the multicast feeder 110 in operation S656. Accordingly, the session manager 130 updates information for the multicast feeder 110 to which the same class peer list information is provided in the databases 134 and 135 in operation S657. When the QoS is not considered, if a multicast feeder 110 with a low band and low performance is inserted in a broadband link, the overall performance may decrease due to the inserted multicast feeder 110. In particular, if a leaf multicast feeder performing only a receiving function and not a transmitting function is inserted in a core part, expandability of a data forwarding route can be obstructed, and data may be delayed in reaching data recipients and the entire system. Therefore, in this event, a method of generating a peer list of same class multicast feeders 110 classified into classes according to the performance of a multicast feeder 110 intending to join is used using a last-in first-out (LIFO) method.

As described above, the multicast feeders 110 are connected between the local multicast domains in which the multicast feeders 110 are placed so that terminals can receive data from a sender via multicast application programs or computing devices. The operation of a multicast feeder 110 is divided into a process when a session starts and a data forwarding process after the session has started.

Figure 7A:
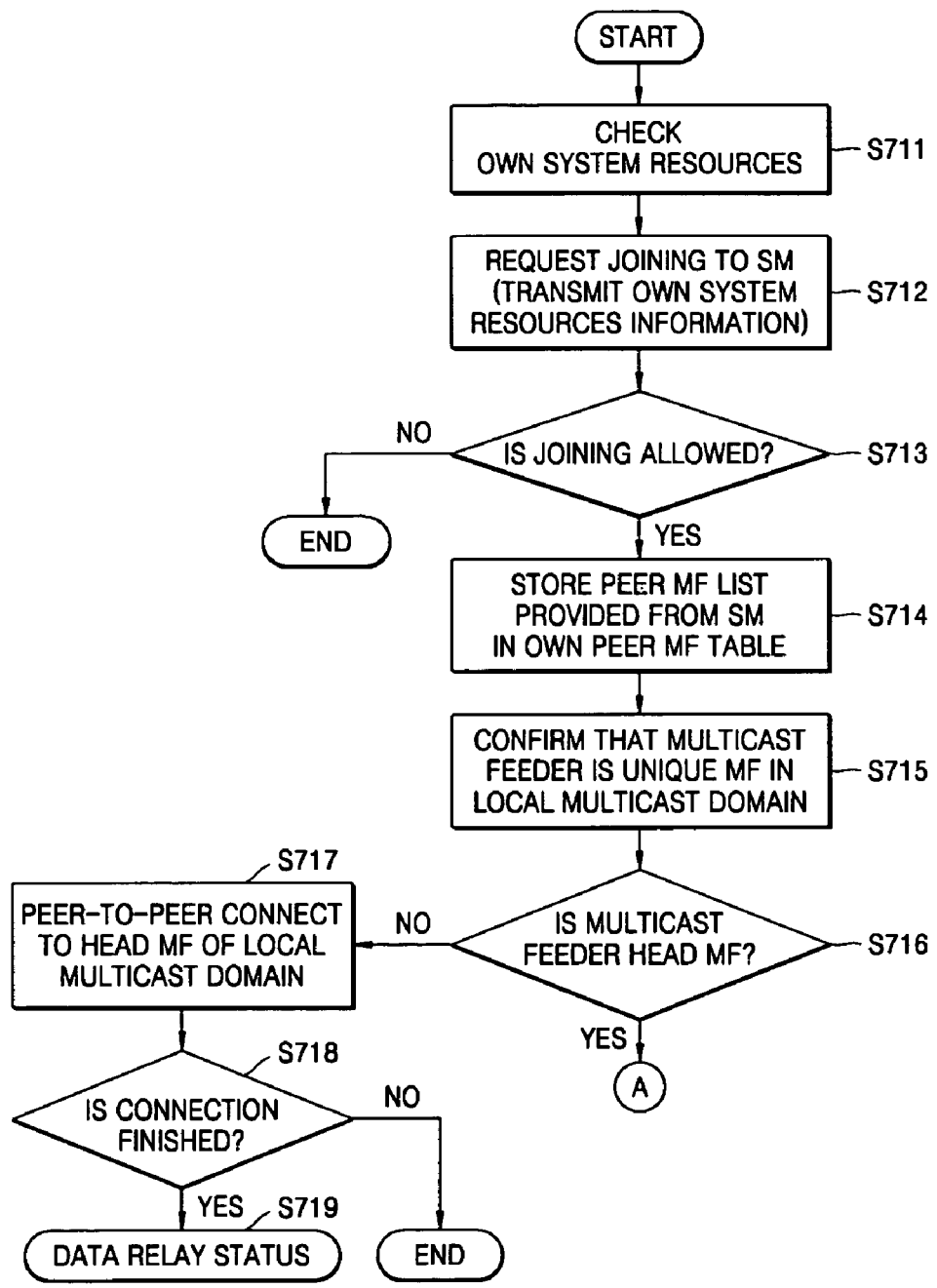
FIGS. 7A and 7B are flowcharts illustrating the operation of a multicast feeder in a session start operation.
Figure 7B:
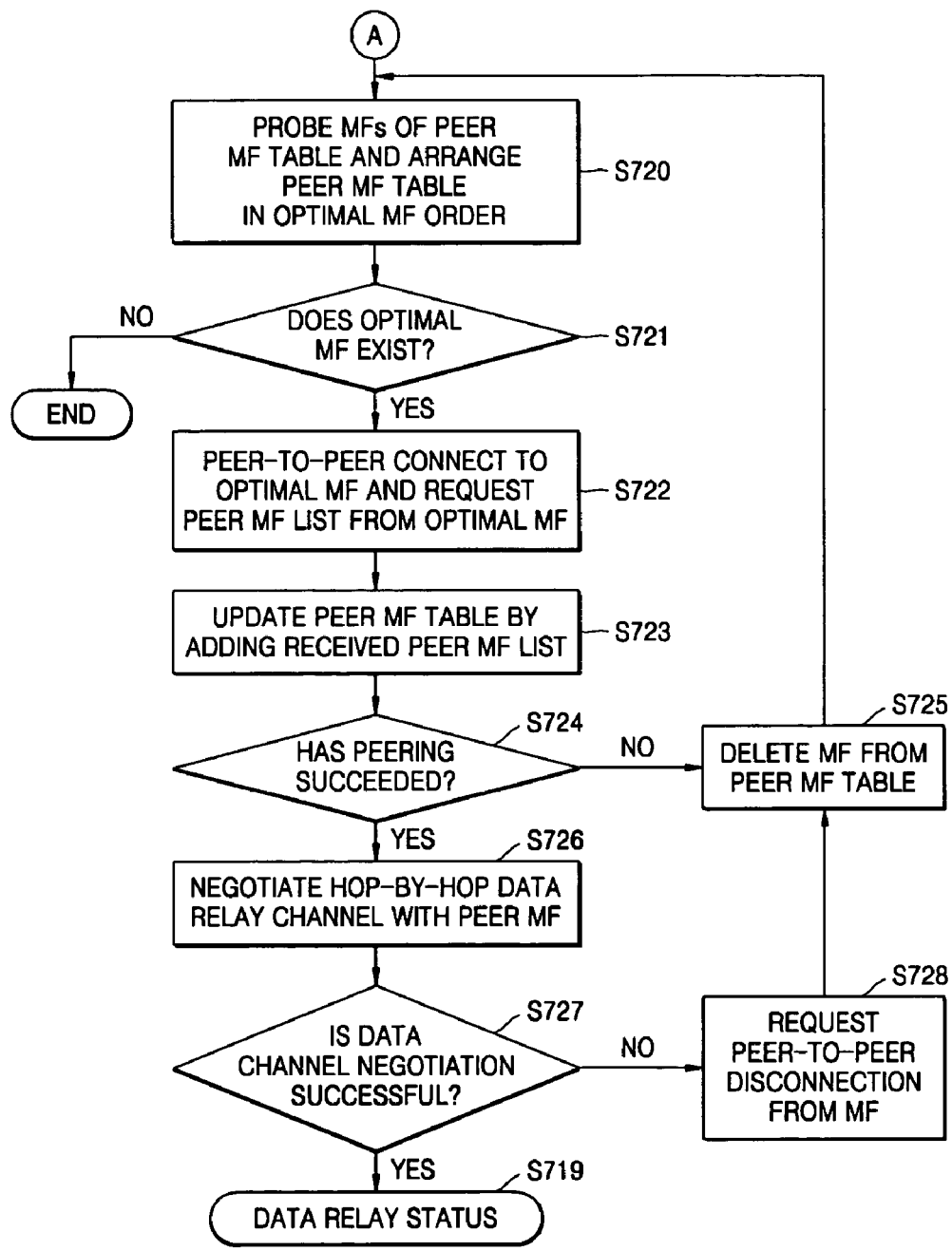

FIGS. 7A and 7B are flowcharts illustrating the operation of a multicast feeder 110 in a session start operation. Referring to FIG. 7A, to join an RMS session, a user drives a multicast feeder 110 using a receiving application program, or a local multicast domain manager sets the multicast feeder 110 so that the multicast feeder 110 always operates. To join the RMS session, the multicast feeder 110 probes its own system resources, notifies the session manager 130 of qualifying conditions, and requests a session join allowance by generating a session join request signal in operations S711 and S712. The qualifying conditions of the multicast feeder 110 are various parameters such as authentication information for joining a session and hardware performance that the multicast feeder 110 can support. To set an optimal efficient data forwarding route, that is, to join a class-divided data route managed by the session manager 130, a peer list of multicast feeders 110 which are in the same class as the multicast feeder 110 is necessary. Therefore, the multicast feeder 110 provides performance information indicating performance that the multicast feeder 110 can support to the session manager 130 and receives and stores a peer list of same class multicast feeders 110 from the session manager 130 in operations S713 and S714.

After receiving join allowance from the session manager 130, the multicast feeder 110 confirms that the multicast feeder 110 is a unique multicast feeder (Head MF) in a local multicast domain in operation S715. FIG. 9 illustrates a mechanism for guaranteeing a unique multicast feeder (Head MF) in a local multicast domain. A new multicast feeder 118 that has received join allowance from the session manager 130 can request an existing multicast feeder 119 to allow the new multicast feeder 118 to become the unique multicast feeder (Head MF) after receiving periodical "Head MF" announcements from the existing multicast feeder 119 in operations S910, S920, and S930. The existing multicast feeder 119 compares resources of the new multicast feeder 118 and the existing multicast feeder 119, and if the performance of the existing multicast feeder 119 is lower than performance of the new multicast feeder 118, the existing multicast feeder 119 relinquishes the role of the unique multicast feeder (Head MF) in operation S940. The multicast feeder 110 having the better performance announces that it is the unique multicast feeder (Head MF) in operation S950. The process of setting a unique multicast feeder (Head MF) is necessary to prevent a multicast feeder 110 from receiving duplicated data when two or more multicast feeders 110 joined to the same session exist in a local multicast domain.

If in operation S716 the multicast feeder 110, which has received join allowance from the session manager 130, is not selected as a unique multicast feeder (Head MF) in the local multicast domain according to the process as shown in FIG. 9, the multicast feeder 110 operates with a data relay status by peer-to-peer connecting to the unique multicast feeder (Head MF) already existing in the local multicast domain in operations S717, S718, and S719.

Figure 10:
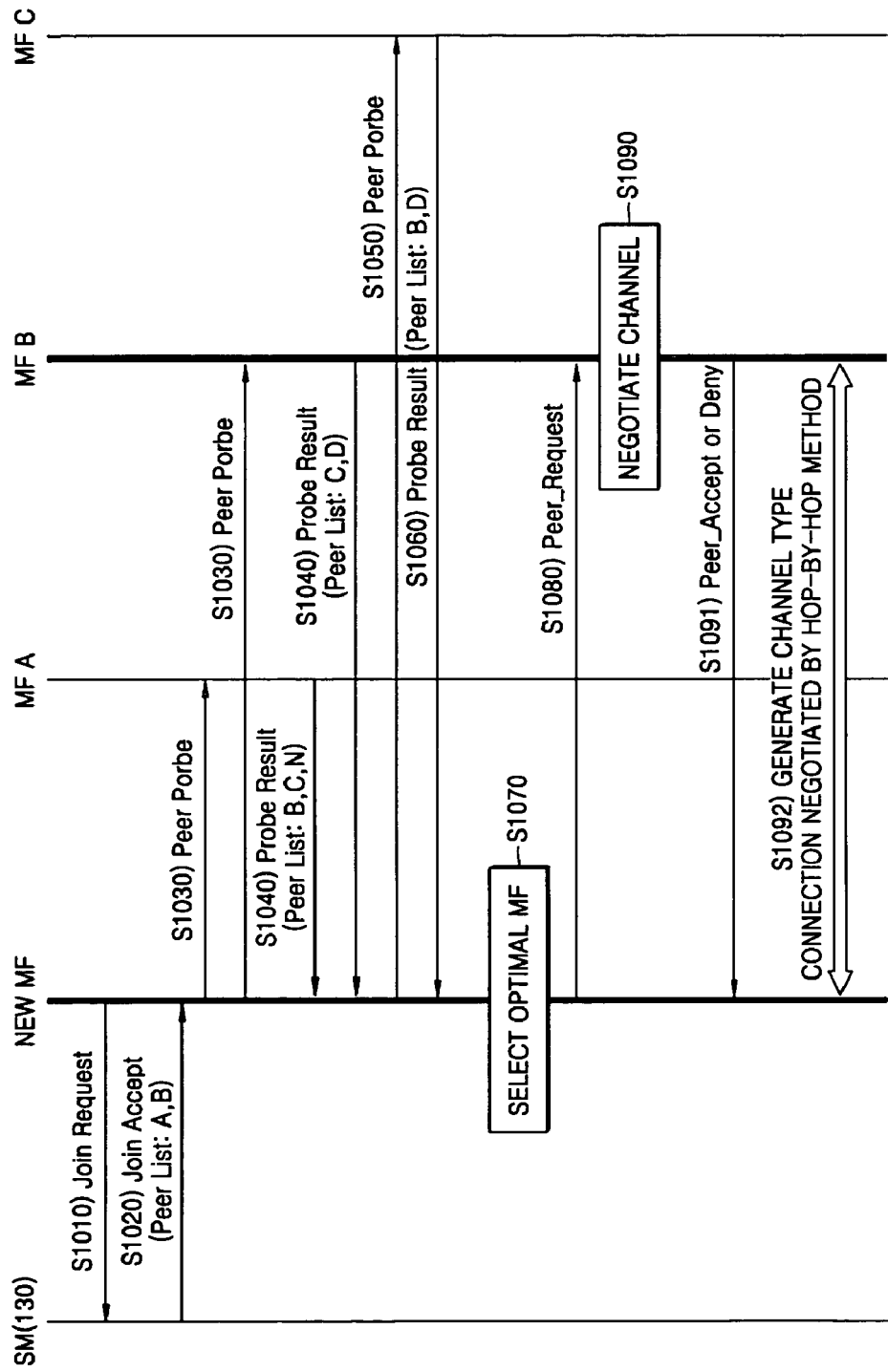
FIG. 10 illustrates a mechanism for obtaining information of neighbor multicast feeders when a multicast feeder joins a session.

Referring to FIG. 7B, the unique multicast feeder (Head MF) in the local multicast domain selected according to the process shown in FIG. 9 probes for an optimal multicast feeder 110, from which the unique multicast feeder (Head MF) can most efficiently receive data using the peer list received from the session manager 130 in operations S716 and S720. FIG. 10 illustrates a mechanism for obtaining information of neighbor multicast feeders 110 when a multicast feeder 110 joins a session. Referring to FIG. 10, a unique multicast feeder (NEW MF) selected in a local multicast domain selects an optimal peer multicast feeder from a peer list (MF A and MF B) received from the session manager 130 and peer lists (MF C, MF D, and MF N) received from the multicast feeders MF A and MF B in operations S1010 through S1070. After selecting the optimal peer multicast feeder, the unique multicast feeder (NEW MF) selected in the local multicast domain connects a hop-by-hop channel to the optimal peer multicast feeder by negotiating the hop-by-hop channel in operations S1080 through S1092.

Likewise, if the optimal peer multicast feeder 110 is probed, the unique multicast feeder (Head MF) tries to have a peer-to-peer relationship with the optimal peer multicast feeder 110 in operations S721 through S725. In response to a peer request from the unique multicast feeder (Head MF), the optimal peer multicast feeder 110 transmits list information of peer multicast feeders 110 stored in the optimal peer multicast feeder 110 along with peer allowance or peer denial in operations S722 through S724. The list information is used to expand information of multicast feeders 110 included in the RMS session. That is, when a peer relationship cannot be maintained because resources of an upstream multicast feeder are exhausted, the unique multicast feeder (Head MF) probes for an optimal peer multicast feeder 110 by continuously probing available multicast feeders 110. After the optimal peer multicast feeder 110 has been selected, the unique multicast feeder (Head MF) negotiates a hop-by-hop channel with the optimal peer multicast feeder 110 in operations S726 through S728. The hop-by-hop channel is a data forwarding route channel used to forward group communication data from a sender to a recipient and can be dynamically selected according to a network environment and resources of each multicast feeder 110. Various tunneling methods using protocols such as IP-within-IP (IPIP), user datagram protocol (UDP), transmission control protocol (TCP), and stream control transmission protocol (SCTP) are widely used for the Internet. A tunneling negotiation mechanism of a hop-by-hop unit that is not uniform is used for multicast data tunneling in the RMS 100. For example, when most multicast feeders 110 are connected using IPIP tunneling, and when data from an upstream multicast feeder 110 cannot be received due to a network address translator (NAT) or Internet firewall installed in a specific area, another tunneling method such as TCP tunneling can be selected by negotiating with the other multicast feeders 110. If the channel negotiation succeeds, the multicast feeder 110 (Head MF) operates with a data relay status by peer-to-peer connecting to the optimal peer multicast feeder 110 in operation S719.

Figure 8A:
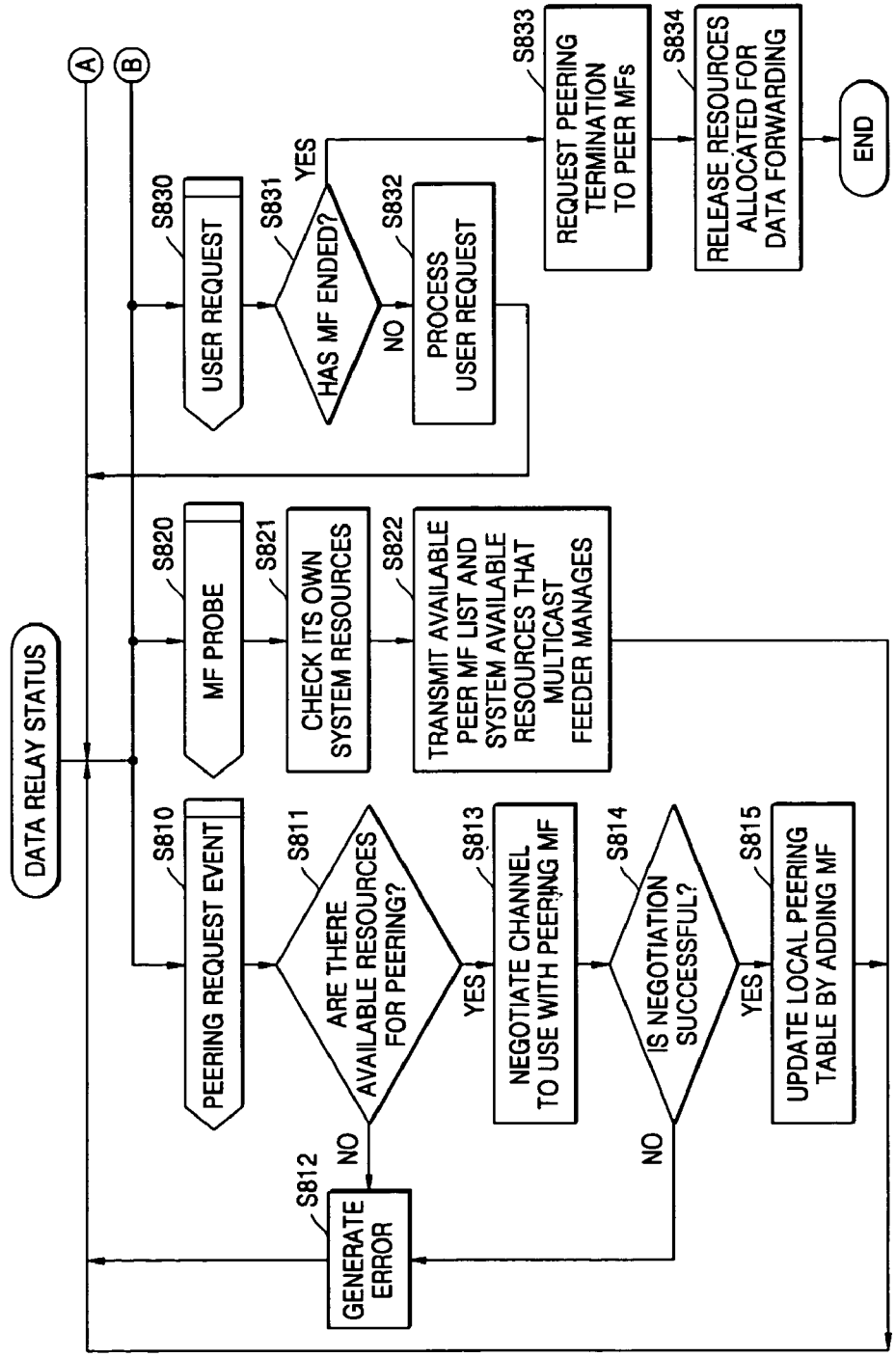
FIGS. 8A and 8B are flowcharts illustrating the operation of a multicast feeder after the session start operation.
Figure 8B:
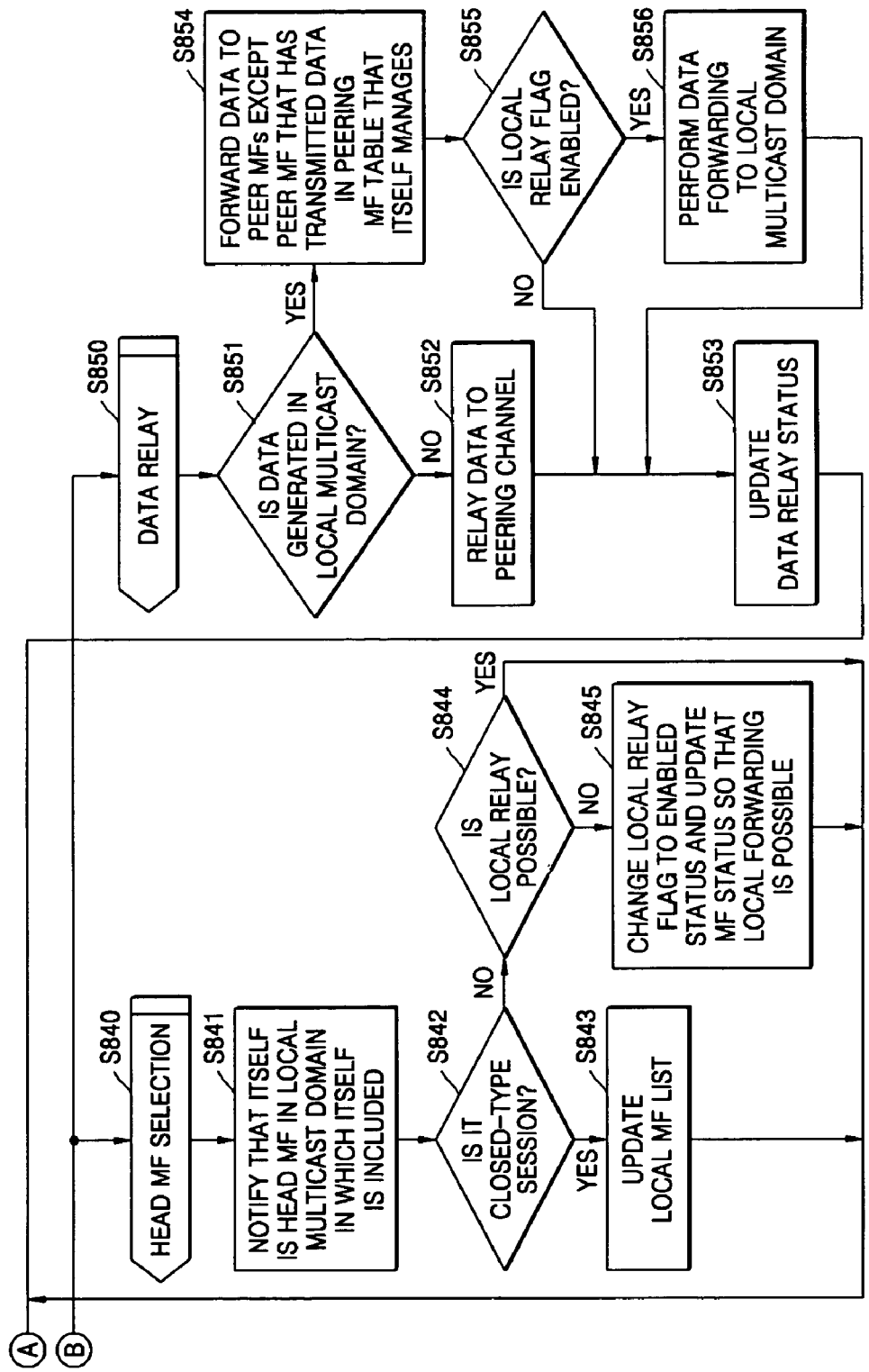

FIGS. 8A and 8B are flowcharts illustrating the operation of a multicast feeder 110 after the session start operation. After multicast feeders 110 join a session and a data forwarding channel is formed, each multicast feeder 110 receives multicast group communication data transmitted by a sender in a unicast environment from an upstream multicast feeder 110 and relays the multicast group communication data to a downstream multicast feeder 110 or another local multicast domain. Referring to FIGS. 8A and 8B, a multicast feeder 110 processes a peering request received from another multicast feeder 110 in operation S810, a resource probe request received from another multicast feeder 110 in operation S820, a user request in operation S830, a unique multicast feeder (Head MF) selection in operation S840, and a data relay request in operation S850.

When a peering request is received from another multicast feeder 110, the multicast feeder 110 determines whether it has sufficient available resources to provide a response to the request from the other multicast feeder 110, and if the multicast feeder 110 has the available resources, the multicast feeder 110 communicates with the other multicast feeder 110 which has requested peering by negotiating a hop-by-hop channel in operations S810 through S815.

When a resource probe request is received from another multicast feeder 110, the multicast feeder 110 checks its own system resources and notifies the other multicast feeder 110 of the resources situation in operations S820 through S822.

Figure 11:
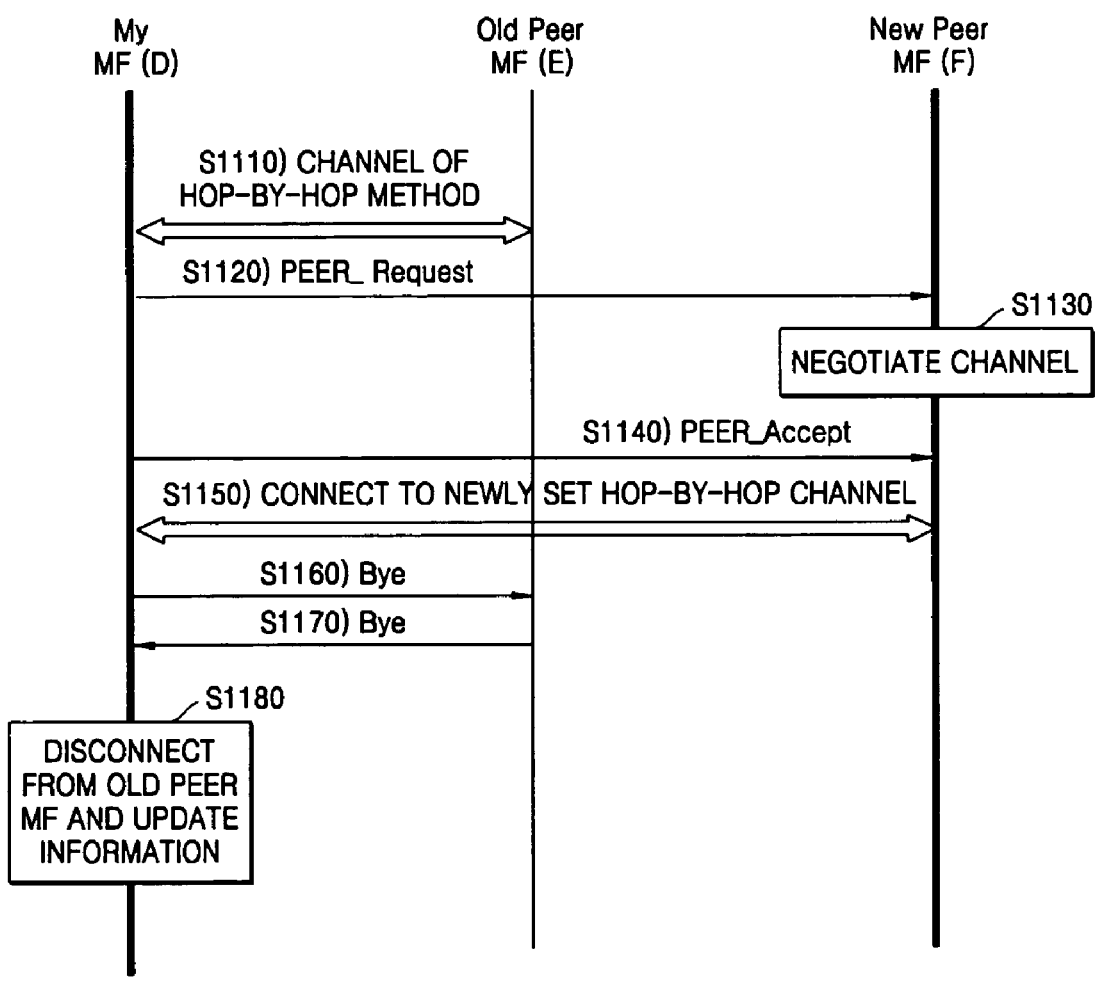
FIG. 11 illustrates the operation of forming a peer to open relationship between a multicast feeder and a new multicast feeder.
Figure 12:
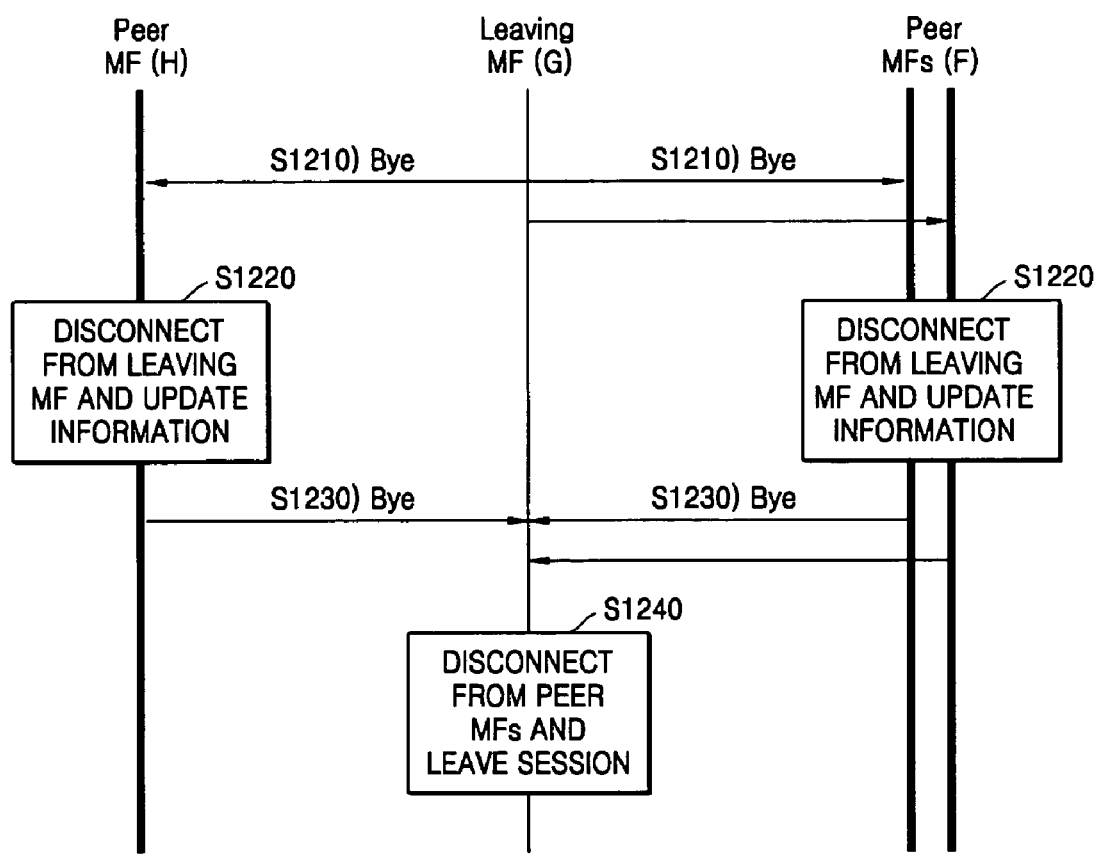
FIG. 12 is illustrates the operation of a multicast feeder leaving a session.

When a user request is generated, the multicast feeder 110 terminates the operation or performs a process in response to the user request in operations S830 through S834. If the multicast feeder 110 finds a multicast feeder 110 having better performance than a multicast feeder 110 to which the multicast feeder 110 is currently peer-to-peer connected, a process as shown in FIG. 11 is performed to form a peer-to-peer relationship with the multicast feeder 110 having the better performance in operation S832. FIG. 11 illustrates the operation of forming a peer to open relationship between a multicast feeder 110 and a new multicast feeder 110. Referring to FIG. 11, a multicast feeder D transmits a peer request to a new peer multicast feeder F, and if the peer request is allowed, the multicast feeder D transmits a bye request to an old peer multicast feeder E in operations S1110 through S1180. FIG. 12 illustrates the operation of a multicast feeder 110 leaving a session. Referring to FIG. 12, when a multicast feeder G intends to leave a session, the multicast feeder G sends and receives a session end request message to and from peer-to-peer connected peer multicast feeders H and F in operations S1210 through S1240. Likewise, a user can request a change in a peer multicast feeder 110, and the requested multicast feeder reselects an optimal peer multicast feeder 110 to communicate with and communicates with the reselected peer multicast feeder by negotiating a hop-by-hop channel.

As described above, a multicast feeder 110 must be a unique multicast feeder (Head MF) to represent a local multicast domain. Therefore, when a unique multicast feeder (Head MF) selection is performed by a multicast feeder 110 intending to join the session, the unique multicast feeder (Head MF) always indicates that the unique multicast feeder (Head MF) is "Head MF" and updates information regarding the newly starting multicast feeder 110 in operations S840 through S845.

When a data relay request is generated, a multicast feeder 110 forwards received data to peer-to-peer connected multicast feeders 110 or its own local multicast domain in operations S850 through S856. When the multicast feeder 110 forwards data to the multicast feeders 110, a tunneling protocol can be changed. That is, even though relay data is received using the TCP, if a channel with other peers is set to the IPIP, the relay data is changed to conform to the IPIP tunneling and forwarded. After the relay data is forwarded, the multicast feeder 110 stores a data forwarding status record to respond to a status report request from the session manager 130 in operation S 853.

As described above, the RMS 100 according to an embodiment of the present invention can perform peering by classes by selecting an optimal multicast feeder based on available resources of each of the relay multicast feeders in order to efficiently form a data forwarding route of a relay group. Also, the RMS 100 negotiates and uses a most appropriate channel between hops, not a data forwarding channel unified in a session or group, in order to form a relay channel. Also, to forward data to a specific group, the RMS 100 connects local multicast domains, in which it is possible to multicast or broadcast on a small scale, as in a local area network (LAN) or a company network in which multicast members of the group are included, without changing an existing 1:1 unicast based Internet infrastructure.

The present invention can be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

An RMS according to an embodiment of the present invention can provide more effective and higher QoS than conventional group communication services by only installing software in a PC without change the current Internet infrastructure. Also, when the RMS is applied to a server-based centralized network game, the number of simultaneous participants is not limited.

Also, in a data relay process, unlike a conventional system simply setting a data route without considering channel characteristics, since the RMS selects a route classified into classes according to characteristics of nodes, which can perform data relay, a bottleneck, which can be generated during a data forwarding process, can be prevented. Therefore, when a mechanism according to the present invention is applied to Internet broadcasting, relatively high picture quality can be obtained in subscribers.

Since an embodiment of the present invention can be systematically used by publicizing a used channel (or a tunneling method) over a session or negotiating an optimal channel between hops, problems, such as reliable real-time data forwarding and firewall passing, can be more easily solved. Also, since an embodiment of the present invention can negotiate one-directional or bi-directional communication using a channel method, the embodiment can be used for an application requiring 1:N real-time data transmission, such as Internet live broadcasting, and for an application requiring N:N reliable data transmission, such as a network game.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A relay multicast system (RMS) comprising:
 a plurality of multicast feeders, each generating a session join request signal, receiving same class peer list information, and relaying multicast data transmission/reception; and
 a session manager managing session information of the multicast feeders and generating the same class peer list information in response to the session join request signals,
 wherein a unique multicast feeder in a local multicast domain selects a peer multicast feeder from the same class peer list information and communicates with the selected peer multicast feeder by negotiating a hop-by-hop channel, and
 wherein, when each of the multicast feeders joins a session, if the multicast feeder receives the same class peer list information the multicast feeder determines whether the multicast feeder is the unique feeder in the local multicast domain, and if the multicast feeder is the unique feeder in the local multicast domain, the multicast feeder selects the peer multicast feeder from the same class peer list information and communicates with the selected peer multicast feeder by negotiating the hop-by-hop channel.

2. The RMS of claim 1, wherein the session manager determines whether session joining of the multicast feeders is allowed using the session information, and each of the multicast feeders sets a relay route using the same class peer list information.

3. The RMS of claim 2, wherein the session manager allows multicast feeders authenticated by an authentication policy included in the session information to join the session when the session manager determines session joining of the multicast feeders.

4. The RMS of claim 2, whereiii the session manager allows all multicast feeders requesting to join the session without authentication when the session manager determines session joining of the multicast feeders.

5. The RMS of claim 1, wherein, after each of the multicast feeders joins the session, if resources of the selected peer multicast feeder are exhausted, the multicast feeder reselects a peer multicast feeder from the other multicast feeders and communicates with the reselected peer multicast feeder by negotiating a hop-by-hop channel.

6. The RMS of claim 1, wherein, if each of the multicast feeders has available resources, when the multicast feeders receive peering requests from the other niulticast feeders, each of the multicast feeders allows the peering request and communicates with the other multicast feeder which has transmitted the peering request by negotiating a hop-by-hop channel.

7. The RMS of claim 1, wherein each of the multicast feeders receives a peer multicast feeder change request from a user via a multicast feeder joined in a session, reselects a peer multicast feeder to communicate with from the other multicast feeders, and communicates with the reselected peer multicast feeder by negotiating a hop-by-hop channel.

8. The RMS of claim 1, further comprising: a plurality of local subnets, each communicating with a relevant multicast feeder in its own local multicast domain.

9. The RMS of claim 1, wherein each of the multicast feeders relays multicast data transmission/reception by changing received relay data to data corresponding to a communication protocol of another multicast feeder to which the relay data is to be transmitted according to channel negotiation with the other multicast feeder to which the received relay data is transmitted.

10. The RMS of claim 1, wherein the session information comprises session definition, session joining conditions, a list of relayable multicast feeders, status information of the multicast feeders and the session, and user definition information.

11. The RMS of claim 1, wherein the same class peer list information is related to multicast feeders having the same class performance as a multicast feeder, which intends to join in we session.

12. A relay multicast communication method comprising:
generating session join request signals in multicast feeders;
generating same class peer list information in response to the session join request signals in a session manager; and
receiving the same class peer list information and relaying multicast data transmission/reception in the multicast feeders,
wherein a unique multicast feeder in a local multicast domain selects a peer multicast feeder from the same class peer list information and communicates with the selected peer multicast feeder by negotiating a hop-by-hop channel; and
wherein, when each of the multicast feeders joins a session, if the multicast feeder receives the same class peer list information, the multicast feeder determines whether the multicast feeder is the unique feeder in the local multicast domain, and if the multicast feeder is the unique feeder in the local multicast domain, the multicast feeder selects the peer multicast feeder from the same class peer list information and communicates with the selected peer multicast feeder by negotiating the hop-by-hop channel.

13. The method of claim 12, wherein the session manager manages session information to be used to determine whether session joining of the multicast feeders is allowed, and the multicast feeders set a relay route using the same class peer list information.

14. The method of claim 13, wherein, when the session manager determines session joining of the multicast feeders, multicast feeders authenticated by an authentication policy included in the session information are allowed to join the session.

15. The method of claim 13, wherein, when the session manager determines session joining of the multicast feeders, all multicast feeders requesting to join the session are allowed to join the session without authentication.

16. The method of claim 12, wherein, after each of the multicast feeders joins the session, if resources of the selected peer multicast feeder are exhausted, the multicast feeder reselects a peer multicast feeder from the other multicast feeders and communicates with the reselected peer multicast feeder by negotiating a hop-by-hop channel.

17. The method of claim 13, wherein, if each of the multicast feeders has available resources, when the multicast feeders receive peering requests from the other multicast feeders, each of the multicast feeders allows the peering request and communicates with the other multicast feeder which has transmitted the peering request by negotiating a hop-by-hop channel.

18. The method of claim 12, wherein each of the multicast feeders receives a peer multicast feeder change request from a user via a multicast feeder joined in a session, reselects a peer multicast feeder to communicate with from the other multicast feeders, and communicates with the reselected peer multicast feeder by negotiating a hop-by-hop channel.

19. The method of claim 12, further comprising: each of local subnets communicating with a relevant multicast feeder in its own local multicast domain.

20. The method of claim 12, wherein each of the multicast feeders relays multicast data transmission/reception by changing received relay data to data corresponding to a communication protocol of another multicast feeder to which the relay data is to be transmitted according to channel negotiation with the other multicast feeder to which the received relay data is transmitted.

21. The method of claim 12, wherein the session information comprises session definition, session joining conditions, a list of relayable multicast feeders, status information of the multicast feeders and the session, and user definition information.

22. The method of claim 12, wherein the same class peer list information is related to multicast feeders having the same class performance as a multicast feeder which intends to join in the session.

* * * * *